(12) United States Patent
Ekshinge

(10) Patent No.: US 11,692,387 B2
(45) Date of Patent: *Jul. 4, 2023

(54) INSULATED DOOR ASSEMBLY

(71) Applicant: WHIRLPOOL CORPORATION, Benton Harbor, MI (US)

(72) Inventor: Sunil S. Ekshinge, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,799

(22) Filed: Jun. 29, 2022

(65) Prior Publication Data

US 2022/0325572 A1     Oct. 13, 2022

Related U.S. Application Data

(63) Continuation of application No. 17/216,900, filed on Mar. 30, 2021, now Pat. No. 11,414,918, which is a continuation of application No. 16/716,773, filed on Dec. 17, 2019, now Pat. No. 11,021,905.

(51) Int. Cl.

| | | |
|---|---|---|
| *E06B 3/263* | (2006.01) | |
| *E05F 11/54* | (2006.01) | |
| *F25D 23/02* | (2006.01) | |

(52) U.S. Cl.
CPC ............ *E06B 3/2632* (2013.01); *E05F 11/54* (2013.01); *E06B 2003/26321* (2013.01); *F25D 23/028* (2013.01)

(58) Field of Classification Search
CPC .......................... F25D 23/028; F25D 2201/14
See application file for complete search history.

(56) References Cited

U.S. PATENT DOCUMENTS

| | | |
|---|---|---|
| 2,753,695 A | 7/1956 | Maranto |
| 5,473,901 A | 12/1995 | Roseen |
| 5,509,248 A | 4/1996 | Dellby et al. |
| 5,586,680 A | 12/1996 | Dellby et al. |
| 6,623,413 B1 | 9/2003 | Wynne |
| 10,161,669 B2 | 12/2018 | Naik et al. |
| 10,697,696 B1 * | 6/2020 | Ekshinge .............. F16L 59/065 |
| 10,995,488 B1 * | 5/2021 | Allard ..................... F24C 15/34 |

(Continued)

FOREIGN PATENT DOCUMENTS

| | | |
|---|---|---|
| JP | H04366093 A | 12/1992 |
| JP | H04366094 A | 12/1992 |

(Continued)

*Primary Examiner* — Daniel J Rohrhoff
(74) *Attorney, Agent, or Firm* — Price Heneveld LLP

(57) ABSTRACT

A vacuum insulated door for an appliance includes an outer wrapper that defines an evacuation port. An inner liner is coupled to the outer wrapper defining an insulating cavity therebetween. A base is coupled to the outer wrapper adjacent to the evacuation port. A servicing tube has a connecting end and a servicing end. The servicing tube is in fluid communication with the insulating cavity via the evacuation port. The connecting end is coupled to the base. A handle has first and second ends coupled to the outer wrapper and a center portion therebetween spaced-apart from the outer wrapper. The first end is coupled to the outer wrapper proximate the evacuation port. The servicing tube extends along an inner surface of the handle.

20 Claims, 7 Drawing Sheets

(56) References Cited

U.S. PATENT DOCUMENTS

| | | | | |
|---|---|---|---|---|
| 11,021,905 | B1* | 6/2021 | Ekshinge | E05F 11/54 |
| 11,414,918 | B2* | 8/2022 | Ekshinge | E05F 11/54 |
| 2005/0235682 | A1 | 10/2005 | Hirai et al. | |
| 2015/0013352 | A1 | 1/2015 | Micic et al. | |
| 2017/0030629 | A1 | 2/2017 | Naik et al. | |
| 2017/0167781 | A1* | 6/2017 | Mukherjee | F25D 23/066 |
| 2017/0327297 | A1 | 11/2017 | Hiemeyer et al. | |
| 2019/0145697 | A1 | 5/2019 | Naik et al. | |
| 2019/0178562 | A1 | 6/2019 | Naik | |
| 2019/0285336 | A1* | 9/2019 | Naik | F25D 23/063 |
| 2020/0103067 | A1 | 4/2020 | Allard et al. | |
| 2020/0232593 | A1 | 7/2020 | Allard et al. | |
| 2020/0256504 | A1* | 8/2020 | Frattini | F16L 59/065 |
| 2021/0207366 | A1* | 7/2021 | Allard | F25D 23/063 |
| 2021/0341214 | A1* | 11/2021 | Naik | B01D 46/58 |

FOREIGN PATENT DOCUMENTS

| | | | |
|---|---|---|---|
| KR | 19900013946 | U | 7/1990 |
| KR | 19990013946 | U | 7/1990 |
| WO | 2005093349 | A1 | 10/2005 |

* cited by examiner

INSULATED DOOR ASSEMBLY

CROSS REFERENCE TO RELATED APPLICATION

The present application is a continuation of U.S. patent application Ser. No. 17/216,900, filed Mar. 30, 2021, now U.S. Pat. No. 11,414,918, entitled "INSULATED DOOR ASSEMBLY", which is a continuation of U.S. patent application Ser. No. 16/716,773, filed on Dec. 17, 2019, now U.S. Pat. No. 11,021,905, entitled "INSULATED DOOR ASSEMBLY," the entire disclosures of each is incorporated herein by reference in its entirety.

BACKGROUND OF THE DISCLOSURE

The present disclosure generally relates to an insulated door assembly, and more specifically, to a vacuum insulated door assembly for an appliance.

SUMMARY OF THE DISCLOSURE

According to one aspect of the present disclosure, a vacuum insulated door for an appliance includes an outer wrapper that defines an evacuation port. An inner liner is coupled to the outer wrapper defining an insulating cavity therebetween. A base is coupled to the outer wrapper adjacent to the evacuation port. A servicing tube has a connecting end and a servicing end. The servicing tube is in fluid communication with the insulating cavity via the evacuation port. The connecting end is coupled to the base. A handle has first and second ends coupled to the outer wrapper and a center portion therebetween spaced-apart from the outer wrapper. The first end is coupled to the outer wrapper proximate the evacuation port. The servicing tube extends along an inner surface of the handle.

According to another aspect of the present disclosure, an insulated door assembly includes an outer wrapper defining an evacuation port. An inner liner is coupled to the outer wrapper defining an insulating cavity therebetween. An evacuation port assembly includes a base coupled to the outer wrapper and a servicing tube coupled to the base. A handle has first and second ends coupled to the outer wrapper. The first end is disposed proximate the evacuation port and the servicing tube extends along the handle.

According to another aspect of the present disclosure, an insulated structure includes a structural wrapper that has an insulating cavity. A handle assembly is coupled to the structural wrapper. The handle assembly includes an evacuation port in fluid communication with the insulating cavity. Gas can be expressed from the insulating cavity through the handle assembly.

These and other features, advantages, and objects of the present disclosure will be further understood and appreciated by those skilled in the art by reference to the following specification, claims, and appended drawings.

Figure 1:
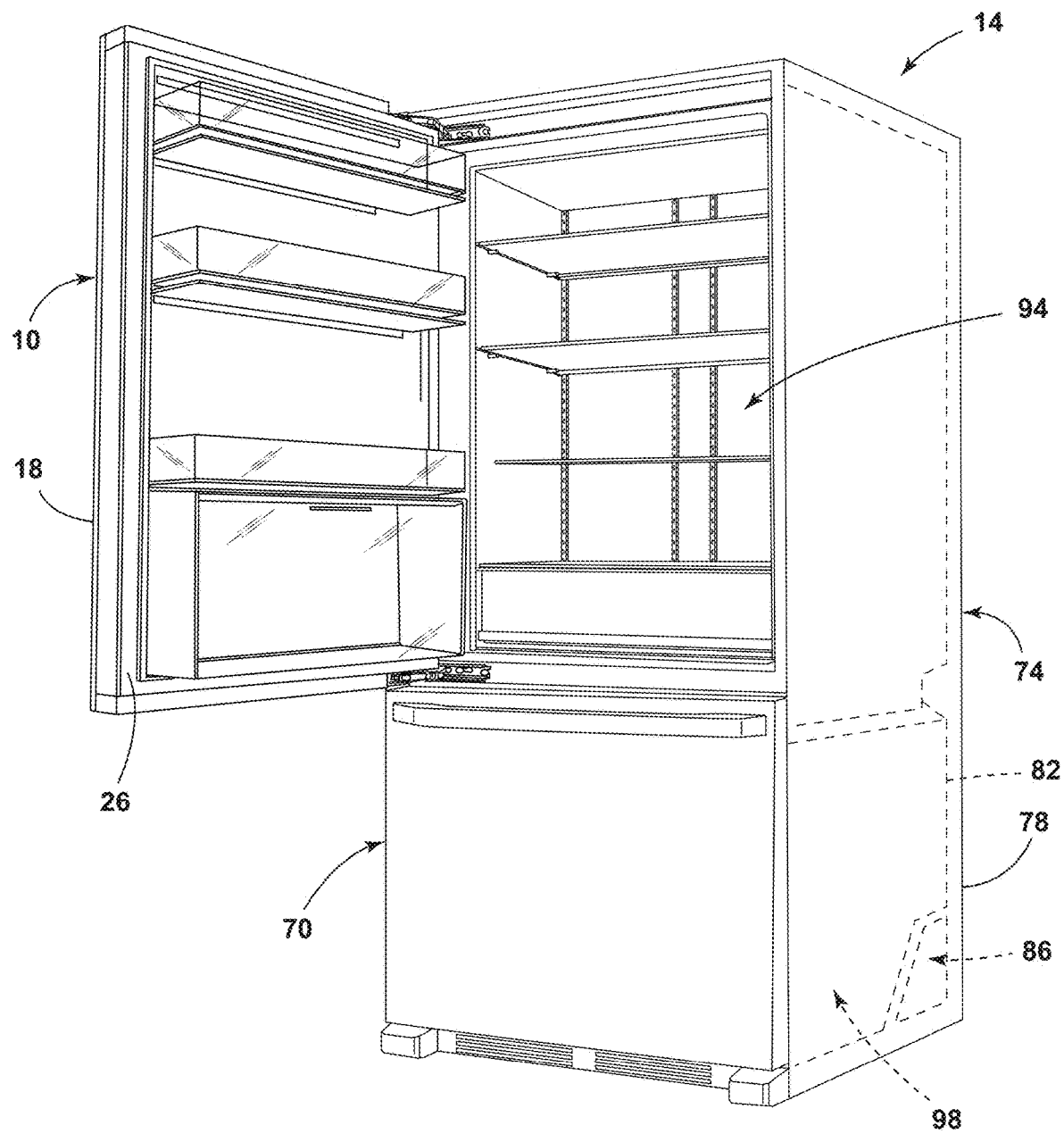
FIG. 1 is a front perspective view of an appliance with an insulated door, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an evacuation port assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates an insulated door for an appliance 14 that includes an outer wrapper 18 defining an evacuation port 22. An inner liner 26 is coupled to the outer wrapper 18 defining an insulating cavity 30 therebetween. A base 34 is coupled to the outer wrapper 18 adjacent to the evacuation port 22. A servicing tube 38 has a connecting end 42 and a servicing end 46. The servicing tube 38 is in fluid communication with the insulating cavity 30 via the evacuation port 22. The connecting end 42 is coupled to the base 34. A handle 50 has first and second ends 54, 58 coupled to the outer wrapper 18 and a center portion 62 therebetween spaced-apart from the outer wrapper 18. The first end 54 is coupled to the outer wrapper 18 proximate the evacuation port 22. The servicing tube 38 extends along an inner surface 66 of the handle 50.

Figure 2:
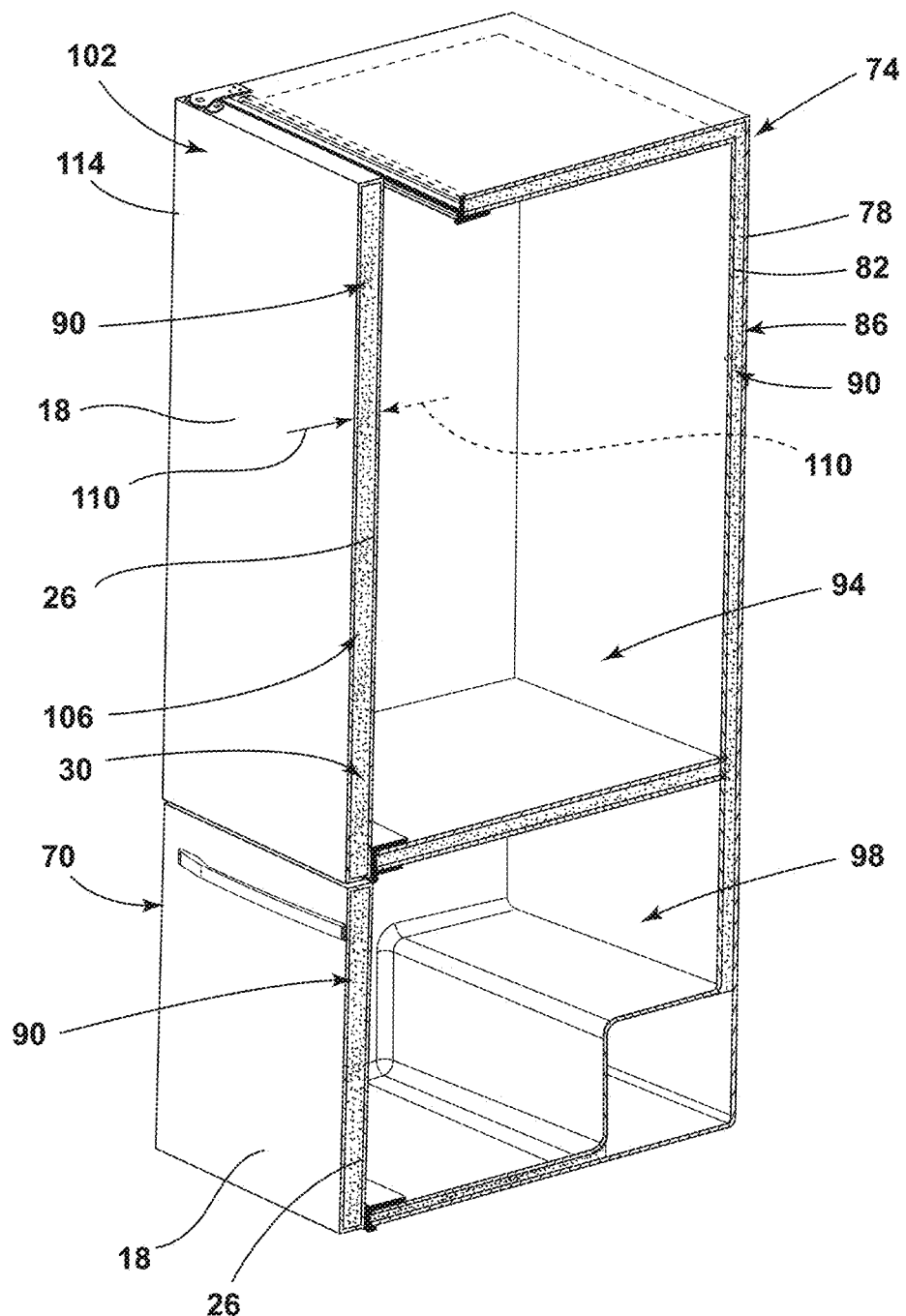
FIG. 2 is a cross-sectional view of the appliance with the insulated door of FIG. 1 with the door closed.

Referring to FIGS. 1 and 2, the appliance 14 is illustrated as a refrigerating appliance, however, it is contemplated that the insulated door disclosed herein may be used with a variety of appliances, structures, or insulation purposes other than with an appliance. Moreover, the illustrated refrigerating appliance is a bottom mount refrigerator having the insulated door 10 and a second insulated door 70, which can have a substantially similar configuration as the insulated door 10 as discussed further herein. The insulated doors 10, 70 may be rotationally and/or laterally operable panel for doors and drawers. In non-limiting examples, the refrigerating appliance can be a bottom mount refrigerator, a bottom mount French door refrigerator, a top mount refrigerator, a side-by-side refrigerator, a four-door French door refrigerator, and/or a five door French door refrigerator, each of which can have one or more insulated doors 10 (e.g., panels).

The insulated door 10 is a vacuum insulated panel. As illustrated in FIGS. 1 and 2, the insulated door 10 includes the outer wrapper 18 coupled with the inner liner 26 defining the insulating cavity 30 therebetween. The outer wrapper 18 and the inner liner 26 may alternatively be referred to as a structural wrapper that defines the insulating cavity 30. A cabinet 74 of the appliance 14 is typically an insulated structure having a cabinet wrapper 78 and a cabinet liner 82 with an insulation cavity 86 defined therebetween.

Each of the insulating cavity 30 of the insulated door 10 and the insulation cavity 86 of the cabinet 74 typically includes one or more insulation materials 90 disposed therein. It is generally contemplated that the insulation materials 90 may be glass type materials, carbon-based powders, silicon oxide-based materials, silica-based materials, insulating gasses, and other standard insulation materials 90 known in the art. The insulation materials 90 substantially fill the insulating cavity 30 forming a substantially continuous layer between the outer wrapper 18 and the inner liner 26. Similarly, the insulation materials 90 substantially fill the insulation cavity 86 forming a substantially continuous layer between the cabinet wrapper 78 and the cabinet liner 82.

In the depicted example of FIGS. 1 and 2, the appliance 14 includes two insulated doors 10, 70, which each include the outer wrapper 18 coupled with the inner liner 26 to define the insulating cavity 30. The insulated doors 10, 70 can be any rotationally and/or laterally operable insulated panel. As such, while insulated door 70 is illustrated as a drawer, it is considered a door for purposes of this application. The insulation materials 90 are disposed in each of the insulating cavities 30. In this way, first and second compartments 94, 98 defined by the cabinet 74 can each be sealed with an insulated door 10, 70. The outer wrapper 18 and the inner liner 26 may be made from a material at least partially resistant to bending, deformation, or otherwise being formed in response to an inward compressive force 102. These materials for the outer wrapper 18 and the inner liner 26 include, but are not limited to, metals, polymers, metal alloys, combinations thereof, and/or other similar substantially rigid materials that can be used for vacuum insulated structures.

Referring still to FIGS. 1 and 2, an at least partial vacuum 106 is defined within the insulating cavity 30. The at least partial vacuum 106 defines a pressure differential 110 between an exterior 114 of the insulated door 10 and the insulating cavity 30. The pressure differential 110 serves to define the inward compressive force 102 that is exerted on both the outer wrapper 18 and the inner liner 26 and tends to bias the outer wrapper 18 and the inner liner 26 toward the insulating cavity 30. Over time, gas can infiltrate into the insulating cavity 30 from an area outside the appliance 14, which can diminish the at least partial vacuum 106. The infiltration of gas is sometimes referred to as gas permeation, which can result in the at least partial vacuum 106 to decrease over time.

Figure 3:
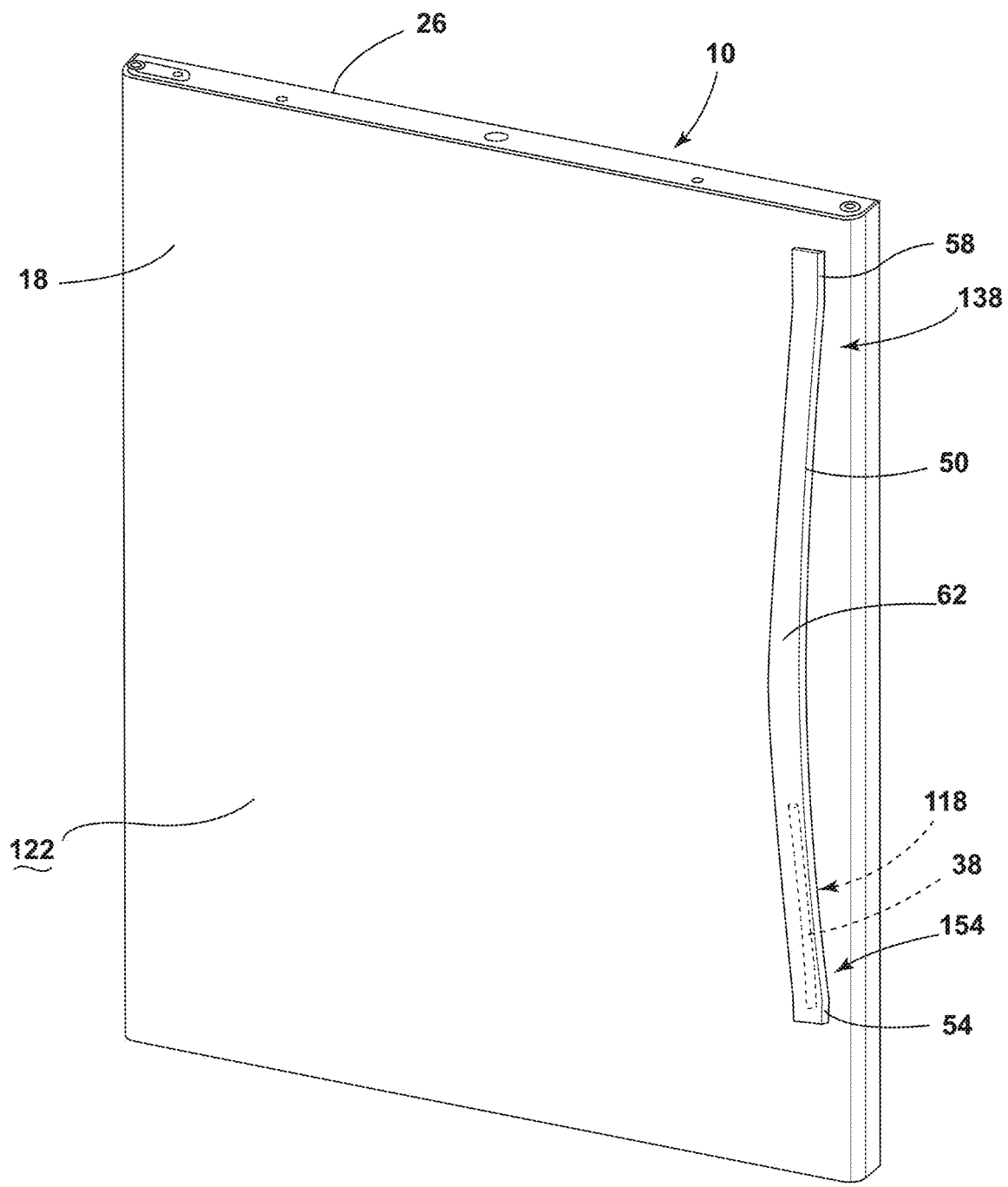
FIG. 3 is a front perspective view of an insulated door with an evacuation port assembly illustrated in phantom, according to the present disclosure.
Figure 4:
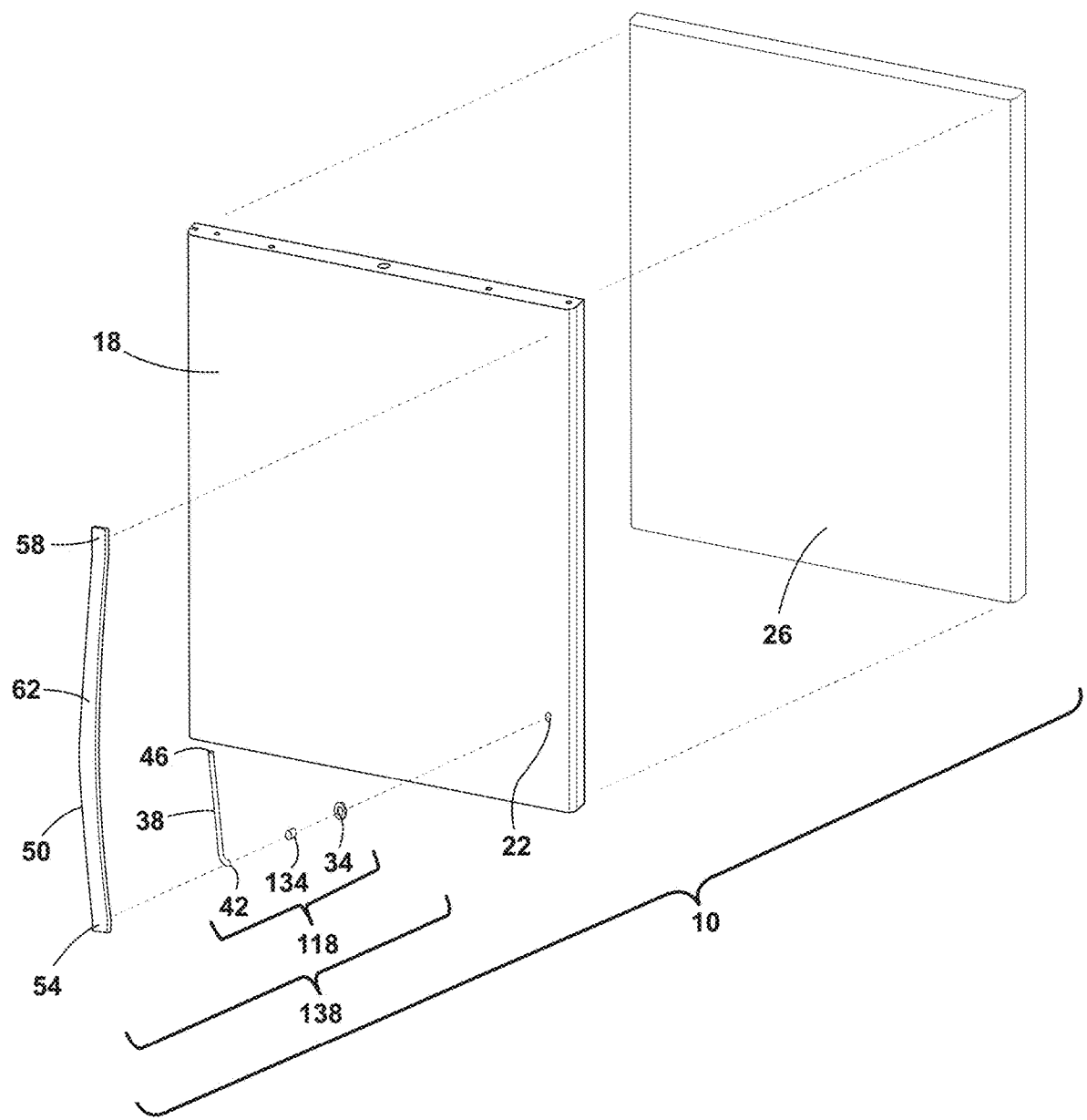
FIG. 4 is an exploded view of the insulated door of FIG. 3.
Figure 6:
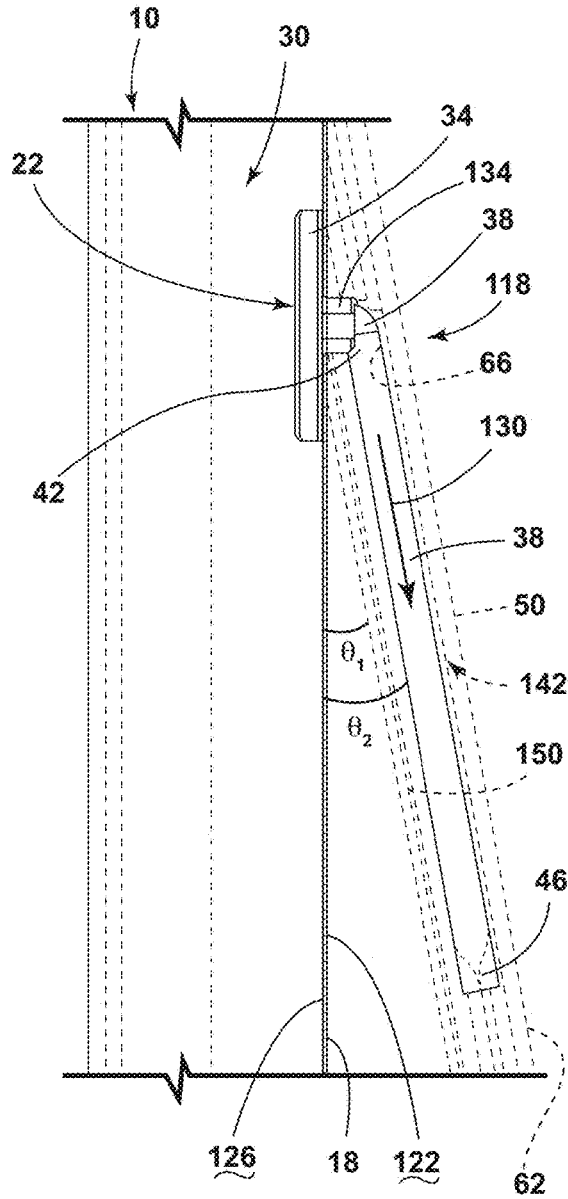
FIG. 6 is a cross-sectional view of a handle assembly of an insulated door having an evacuation port assembly with a handle illustrated in phantom, according to the present disclosure.

Referring to FIGS. 2-4, the outer wrapper 18 defines the evacuation port 22, which is an opening into the insulating cavity 30. The at least partial vacuum 106 is typically defined by evacuation of the insulated door 10 through the evacuation port 22 and an evacuation port assembly 118. The evacuation port assembly 118 typically includes the base 34 and the servicing tube 38. The evacuation port assembly 118 is in fluid communication with the insulating cavity 30 via the evacuation port 22 to expel gas from the insulating cavity 30. The base 34 is coupled to the outer wrapper 18 adjacent to the evacuation port 22. Typically, the base 34 surrounds the evacuation port 22. The base 34 may be coupled to an exterior surface 122 of the outer wrapper 18, or alternatively, may be coupled to an interior surface 126 of the outer wrapper 18, as best illustrated in FIG. 6.

Referring still to FIGS. 3 and 4, the base 34 can be coupled to the outer wrapper 18 by various mechanisms and methods, including, but not limited to, projection, welding, resistance welding, adhering, or other coupling methods typically used with vacuum insulated structures. The base 34 is typically formed of a rigid material, such as metal or metal alloys. In non-limiting examples, the base 34 can be configured as a steel washer.

The servicing tube 38 is coupled to the base 34 and extends from the base 34 away from the exterior surface 122 of the outer wrapper 18. The servicing tube 38 is typically formed from a metal material or another material that is generally rigid, while still being capable of compression, such as crimping. In non-limiting examples where the base 34 is configured as a steel disk, such as a washer or nut, the servicing tube 38 can be brazed to the base 34. The servicing tube 38 is in fluid communication with the insulating cavity 30. According to various aspects, the servicing tube 38 defines an evacuation path 130 (FIG. 5), such that gas can be expressed from the insulating cavity 30 and along the evacuation path 130 of the servicing tube 38.

Referring still to FIGS. 3 and 4, the evacuation port assembly 118 may include a connector 134 disposed between the base 34 and the servicing tube 38. In this way, the connector 134 is coupled to the base 34 and the servicing tube 38 is coupled to the connector 134. The connector 134 can be coupled to the outer wrapper 18 and surround the evacuation port 22. Alternatively, the connector 134 can extend at least partially through the evacuation port 22 into the insulating cavity 30 to couple with the base 34.

The handle 50 includes the first and second ends 54, 58 coupled to the exterior surface 122 of the outer wrapper 18. The center portion 62 of the handle 50 is spaced-apart from the exterior surface 122 to define a grasping area for a user. The handle 50 is disposed over the evacuation port assembly 118 to substantially, or entirely, conceal and/or obscure the evacuation port assembly 118 from the view of the user. As illustrated, the first end 54 of the handle 50 is coupled to the outer wrapper 18 proximate the evacuation port assembly 118 and the evacuation port 22. The first end 54 is illustrated as a lower end of a vertically-oriented handle 50. However, it is contemplated that the upper end (e.g., the second end 58) of a vertically-oriented handle 50 may be disposed proximate the evacuation port assembly 118. Further, it is contemplated that the handle 50 can be horizontally-oriented, or positioned at any angle relative to the insulated door 10, and either of the first and second ends 54, 58 can be disposed proximate the evacuation port assembly 118.

Figure 5:
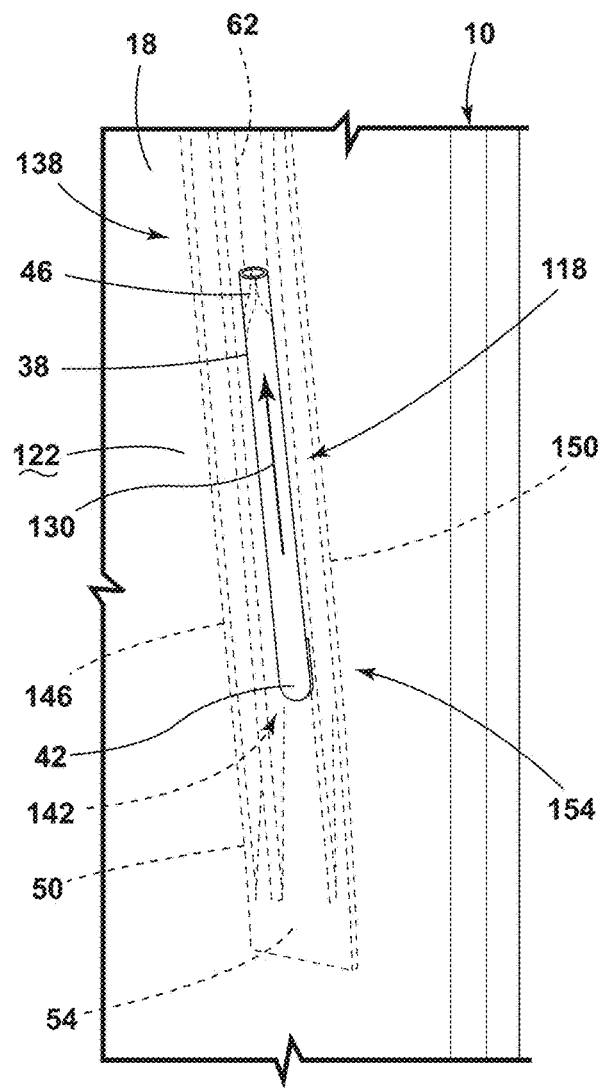
FIG. 5 is an enlarged view of the evacuation port assembly of FIG. 3 with a handle illustrated in phantom.

Referring to FIGS. 3, 5, and 6, the handle 50 and the evacuation port assembly 118 form a handle assembly 138 that operates to substantially provide access to the insulating cavity 30, while obscuring the evacuation port assembly 118 from view. As illustrated, the handle 50 slopes from the first end 54 to the center portion 62 and then slopes in a mirror image from the center portion 62 to the second end 58. Each of the sloping portions defined by the handle 50 is typically substantially consistent, thereby defining acute angles $\theta_1$ between the sloping portions of the handle 50 and the exterior surface 122 of the outer wrapper 18.

In the depicted example, the base 34 is coupled to the interior surface 126 of the outer wrapper 18. The connector 134 is coupled to the base 34 and extends outward from the exterior surface 122. The servicing tube 38 includes the connecting end 42 coupled to the connector 134. According to various aspects, the connecting end 42 is curved to couple with the connector 134 and allow the servicing tube 38 to extend at an angle $\theta_2$ from the connector 134. As illustrated, the servicing tube 38 and the exterior surface 122 of the outer wrapper 18 define an acute angle $\theta_2$ therebetween. The acute angle $\theta_1$ defined between the handle 50 and the exterior surface 122 is substantially the same as the acute angle $\theta_2$ defined between the servicing tube 38 and the exterior surface 122. In this way, the servicing tube 38 extends away from the outer wrapper 18 at a substantially same orientation as the handle 50. Moreover, the servicing tube 38 typically extends along the inner surface 66 of the handle 50 for at least a portion of a length of the handle 50 to further conceal the servicing tube 38 from view. The connecting end 42 of the servicing tube 38 is positioned proximate the exterior surface 122 of the outer wrapper 18 and the first end 54 of the handle 50. The servicing end 46 of the servicing tube 38 abuts the inner surface 66 proximate of the center portion 62 the handle 50 and is spaced-apart from the exterior surface 122 of the outer wrapper 18.

According to various aspects, the handle 50 defines an inner groove 142 in the inner surface 66 thereof. The inner groove 142 extends from at least one of the first and second ends 54, 58 for at least a portion of the length of the handle 50. The servicing tube 38 extends at least partially into the inner groove 142. The handle 50 includes sidewalls 146, 150 that at least partially define the inner groove 142. The sidewalls 146, 150 are disposed on opposing sides of the inner groove 142 to assist in obscuring the servicing tube 38 from view. The sidewalls 146, 150 typically extend closer to the exterior surface 122 of the outer wrapper 18 than the servicing tube 38, thereby allowing the servicing tube 38 to be entirely positioned within the inner groove 142.

Referring still to FIGS. 5 and 6, the handle 50 and the evacuation port assembly 118 are typically coupled to the outer wrapper 18 at substantially the same attachment point. This is advantageous for fully concealing and aligning the evacuation port assembly 118 with the handle 50. Further, this is also advantageous for providing convenient assembly of the handle assembly 138.

In various examples, the handle assembly 138 can include the evacuation port 22, which provides access to the insulating cavity 30. The handle assembly 138 includes at least the base 34 coupled to the outer wrapper 18, the servicing tube 38 coupled to the base 34, and the handle 50 coupled to the outer wrapper 18. The handle assembly 138 can further include the connector 134. The servicing end 46 of the servicing tube 38 defines the evacuation port 22 and the connecting end 42 of the servicing tube 38 is in fluid communication with the insulating cavity 30 through an additional opening in the outer wrapper 18.

Referring to FIGS. 1-6, the insulated door 10 is generally formed using vacuum insulation technology. The evacuation port 22 provides access to the insulating cavity 30 in which the pressure differential 110 is defined after the at least partial vacuum 106 is drawn. A vacuum device is positioned around the servicing end 46 of the servicing tube 38 and draws the at least partial vacuum 106 through the servicing tube 38. Once the desired pressure differential 110 is defined between the insulating cavity 30, the inner liner 26, and the outer wrapper 18 of the insulated door 10, the servicing end 46 of the servicing tube 38 is crimped to seal the servicing tube 38, and ultimately, the insulated door 10. A service technician can remove the handle 50 from the insulated door 10 to access the evacuation port assembly 118. The crimped servicing end 46 of the servicing tube 38 is cut to provide access to the insulating cavity 30. The at least partial vacuum 106 may be redrawn through the servicing tube 38 via the cut servicing end 46 to the desired pressure differential 110. Once re-evacuated, the servicing end 46 is crimped again to seal the servicing tube 38 and the insulated door 10. The service technician can then couple the handle 50 to the insulated door 10 to obscure the evacuation port assembly 118 from the view of the user. The insulated door 10 may be re-evacuated any practicable number of times through the same process, however, the number of re-evacuations depends on the length of the servicing tube 38.

Figure 7:
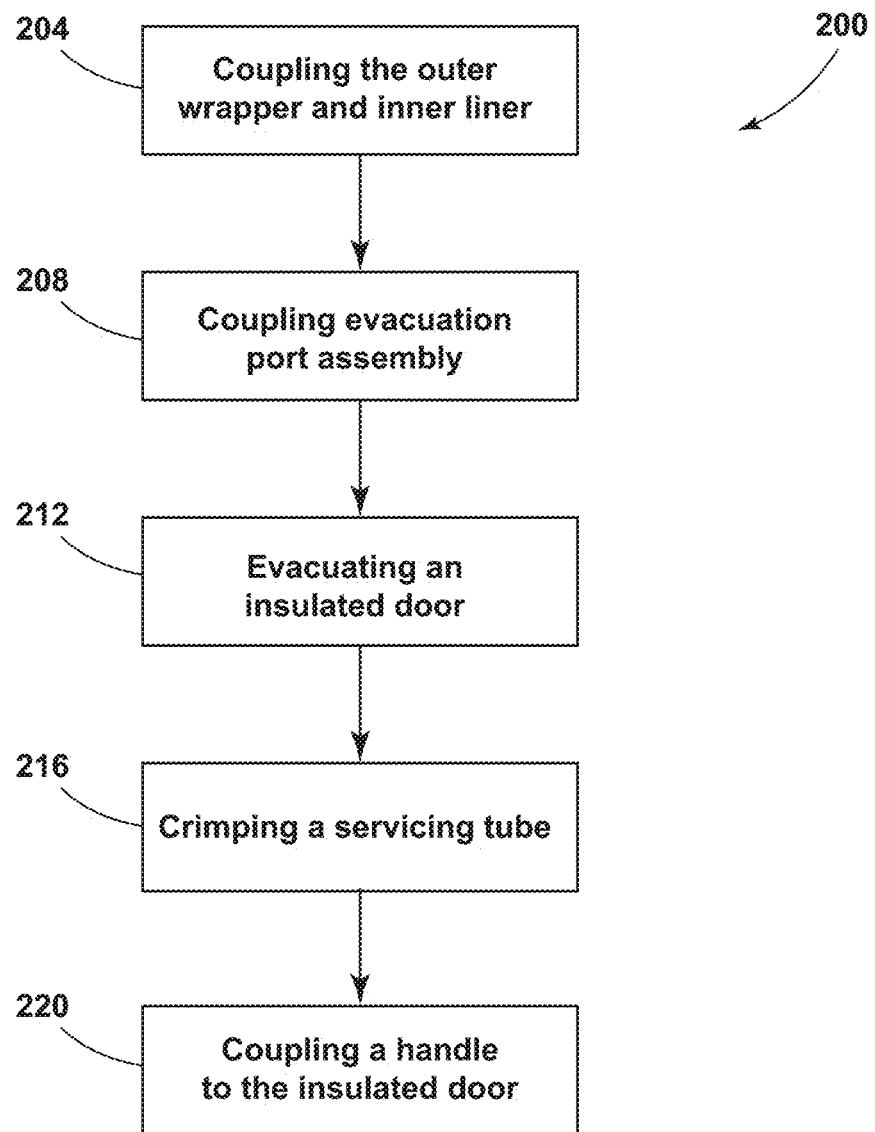
FIG. 7 is a flow diagram of a method of assembling an insulated door, according to the present disclosure.

Referring to FIG. 7, and with further reference to FIGS. 1-6, a method 200 of assembling the insulated door 10 includes step 204 of coupling the outer wrapper 18 to the inner liner 26. An insulating material (e.g., insulating materials 90) is also typically disposed within the cavity 30 In step 208, the evacuation port assembly 118 is coupled with the outer wrapper 18. Typically, the base 34 is coupled with the outer wrapper 18, the connector 134 is coupled to the base 34, and the servicing tube 38 is coupled to the connector 134. In step 212, the insulated door 10 is evacuated to define the desired pressure differential 110 between the insulating cavity 30 and the exterior 114 of the insulated door 10. The evacuation device is positioned to engage, such as extend around, the servicing end 46 of the servicing tube 38. This places the evacuation device is in fluid communication with the insulating cavity 30 to draw the at least partial vacuum 106 within the insulated door 10. In step 216, the servicing end 46 of the servicing tube 38 is crimped or otherwise sealed to seal the insulating cavity 30 and retain the at least partial vacuum 106. In step 220, the handle 50 is positioned over the evacuation port assembly 118 and coupled to the exterior surface 122 of the outer wrapper 18. When the handle 50 is coupled with the outer wrapper 18, the servicing tube 38 extends into the inner groove 142 of the handle 50. In this way, the handle 50 is coupled to the outer wrapper 18 in a manner that substantially, or entirely, conceals the evacuation port assembly 118.

Figure 8:
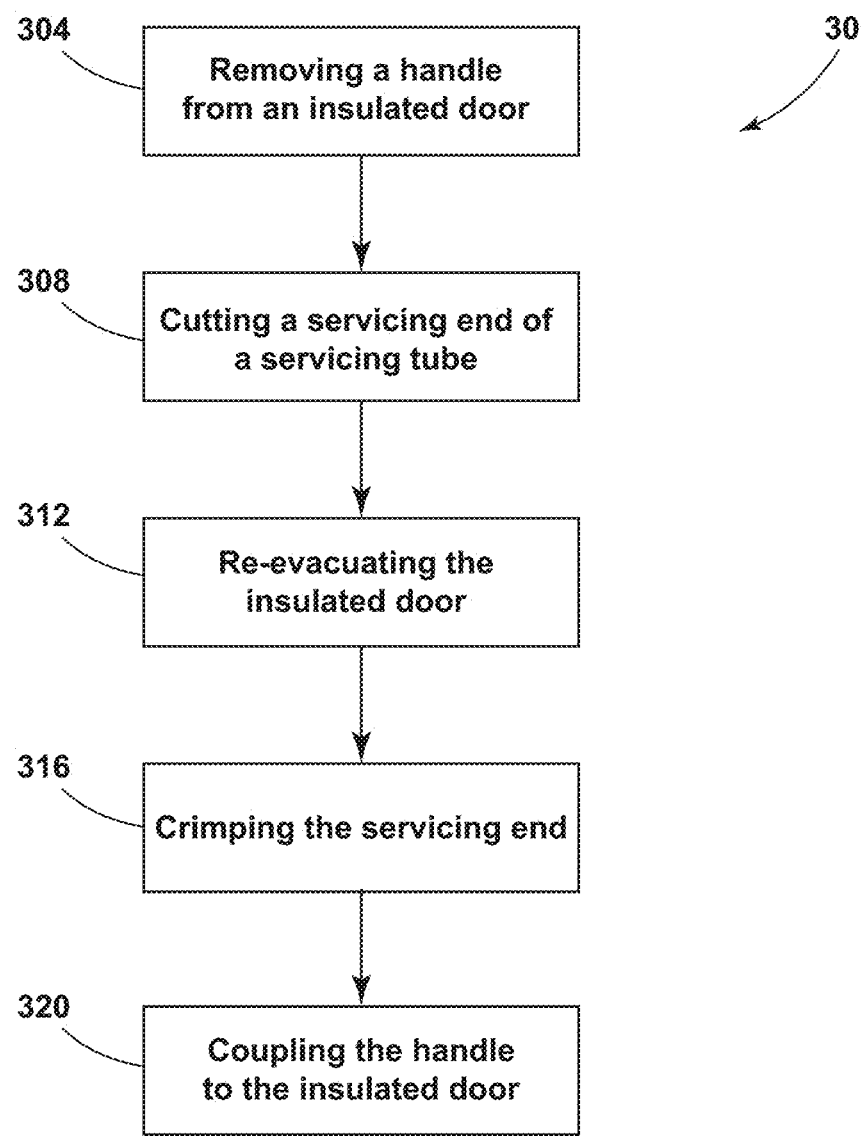
FIG. 8 is a flow diagram of a method of servicing an insulated door, according to the present disclosure.

Referring to FIG. 8, and with further reference to FIGS. 1-7, a method 300 of servicing the insulated door 10 includes step 304 of removing the handle 50 from the insulated door 10. Removing the handle 50 provides access to the evacuation port assembly 118. In step 308, the servicing end 46 of the servicing tube 38 is cut, thereby breaking the seal in the servicing tube 38 and providing access to the insulating cavity 30 of the insulated door 10. In step 312, the insulated door 10 is re-evacuated. The evacuation device is engaged with the cut servicing end 46 of the servicing tube 38 to produce the desired pressure differential 110 after the at least partial vacuum 106 is drawn. In step 316, the evacuation device is removed from the cut servicing end 46, and the cut servicing end 46 of the servicing tube 38 is again crimped or otherwise sealed to seal the insulating cavity 30. In step 320, the handle 50 is coupled to the outer wrapper 18 over the evacuation port assembly 118. The insulated door 10 may be serviced any practicable number of times, which can depend on the length of the servicing tube 38.

According to various examples, the insulated door 10 can be used in various appliances that can include, but are not limited to, refrigerators, freezers, coolers, ovens, dishwashers, laundry appliances, and other similar appliances and fixtures within household and commercial settings. Additionally, the insulation materials 90 can be a free-flowing material that can be poured, blown, compacted, or otherwise disposed within the insulating cavity 30. This free-flowing material can be in the form of various silica-based materials, such as fumed silica, precipitated silica, nano-sized, and/or micro-sized aerogel powder, rice husk ash powder, perlite, glass spheres, hollow glass spheres, cenospheres, diatomaceous earth, combinations thereof, and other similar insulating particulate material.

Referring to FIGS. 1-8, the present disclosure provides a variety of advantages. For example, the evacuation port assembly 118 is coupled to the exterior surface 122 of the insulated door 10. In this way, the evacuation port assembly 118 maximizes space within the appliance 14, unlike conventional evacuation assemblies that are disposed on a liner and extend into the appliance 14. Further, the handle 50 partially, or entirely, obscures the evacuation port assembly 118 from view. Moreover, the handle 50 operates as a cover over the evacuation port assembly 118 to protect the components of the evacuation port assembly 118. Additionally, the handle 50 operates to cover the evacuation port assembly 118 without an additional cover component added to the appliance 14. In this way, the insulated door 10 can reduce manufacturing and production costs. Additional benefits or advantages of using this device may also be realized and/or achieved.

The device disclosed herein is further summarized in the following paragraphs and is further characterized by combinations of any and all of the various aspects described herein.

According to an aspect of the present disclosure, a vacuum insulated door for an appliance includes an outer wrapper that defines an evacuation port. An inner liner is coupled to the outer wrapper defining an insulating cavity therebetween. A base is coupled to the outer wrapper adjacent to the evacuation port. A servicing tube has a connecting end and a servicing end. The servicing tube is in fluid communication with the insulating cavity via the evacuation port. The connecting end is coupled to the base. A handle has first and second ends coupled to the outer wrapper and a center portion therebetween spaced-apart from the outer wrapper. The first end is coupled to the outer wrapper proximate the evacuation port. The servicing tube extends along an inner surface of the handle.

According to another aspect, a handle is disposed over a base and a servicing tube.

According to another aspect, a servicing end of a servicing tube abuts an inner surface of a center portion of a handle and is spaced-apart from an outer wrapper.

According to another aspect, a handle defines an inner groove and a servicing tube extends at least partially into the inner groove.

According to another aspect, a handle includes sidewalls disposed on opposing sides of an inner groove. The sidewalls conceal a servicing tube.

According to another aspect, a servicing tube and an outer wrapper define an acute angle therebetween.

According to another aspect, a handle conceals a servicing tube.

According to another aspect, a connecting end of a servicing tube is curved to couple with a base.

According to another aspect of the present disclosure, an insulated door assembly includes an outer wrapper that defines an evacuation port. An inner liner is coupled to the outer wrapper defining an insulating cavity therebetween. An evacuation port assembly includes a base coupled to the outer wrapper and a servicing tube coupled to the base. A handle has first and second ends coupled to the outer wrapper. The first end is disposed proximate the evacuation port and the servicing tube extends along the handle.

According to another aspect, a handle is disposed over an evacuation port assembly.

According to another aspect, a servicing tube extends along an inner surface of a handle.

According to another aspect, an attachment point between a first end of a handle and an outer wrapper is disposed adjacent to a base.

According to another aspect, a servicing tube includes a connecting end and a servicing end. An evacuation port assembly includes a connector disposed between a base and the connecting end of the servicing tube.

According to another aspect, a connecting end of a servicing tube is curved to couple with a connector.

According to another aspect, a handle defines an inner groove on an inner surface thereof. A servicing tube is at least partially disposed within the inner groove.

According to another aspect of the present disclosure, an insulated structure includes a structural wrapper that has an insulating cavity. A handle assembly is coupled to the structural wrapper. The handle assembly includes an evacuation port in fluid communication with the insulating cavity. Gas can be expressed from the insulating cavity through the handle assembly.

According to another aspect, a handle assembly includes a base coupled to a structural wrapper, a servicing tube coupled to the base, and a handle coupled to the structural wrapper.

According to another aspect, a handle defines an inner groove and a servicing tube is disposed within the inner groove.

According to another aspect, a handle assembly includes a handle and a servicing tube. The servicing tube defines an evacuation path in fluid communication with an insulating cavity.

According to another aspect, an end of a handle and a connecting end of a servicing tube are coupled to a structural wrapper at a same attachment point.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method of assembling an insulated appliance door, comprising:
   coupling an outer wrapper with an inner liner to define an insulating cavity therebetween;
   coupling an evacuation port assembly to the outer wrapper and in fluid communication with the insulating cavity;
   evacuating the insulating cavity via the evacuation port assembly to define a pressure differential between the insulating cavity and an area external to said insulated appliance door; and
   coupling a handle to the outer wrapper over the evacuation port assembly.

2. The method of claim 1, further comprising:
   dispensing insulating material into the insulating cavity.

3. The method of claim 1, wherein the step of coupling the evacuation port assembly to the outer wrapper includes positioning the evacuation port assembly to be in fluid communication with an evacuation port defined by the outer wrapper.

4. The method of claim 1, wherein the step of coupling the evacuation port assembly to the outer wrapper includes coupling a base of the evacuation port assembly to the outer wrapper and coupling a connector to the base.

5. The method of claim 4, wherein the step of coupling the evacuation port assembly to the outer wrapper includes coupling a servicing tube to the connector.

6. The method of claim 1, wherein the step of evacuating the insulating cavity includes drawing an at least partial vacuum within the insulating cavity.

7. The method of claim 1, further comprising:
   sealing the evacuation port assembly to retain the pressure differential.

8. A method of assembling an insulated structure, comprising:
   providing a structural wrapper that defines an evacuation port in fluid communication with an insulating cavity;
   coupling an evacuation port assembly to the structural wrapper, wherein the evacuation port assembly is in fluid communication with the insulating cavity via the evacuation port;
   drawing an at least partial vacuum within the insulating cavity via a servicing tube of the evacuation port assembly; and
   coupling a handle to the structural wrapper over the evacuation port assembly.

9. The method of claim 8, wherein the step of coupling the handle includes positioning the handle to conceal the evacuation port assembly.

10. The method of claim 8, wherein the step of coupling the handle includes positioning the servicing tube within a groove defined by the handle.

11. The method of claim 8, further comprising:
    dispensing an insulating material within the insulating cavity.

12. The method of claim 8, further comprising:
    crimping an end of the servicing tube to maintain the at least partial vacuum within the insulating cavity.

13. The method of claim 8, wherein the step of providing the structural wrapper includes coupling an outer wrapper to an inner liner.

14. The method of claim 8, wherein the step of coupling the evacuation port assembly includes coupling a base to the structural wrapper and the servicing tube to the base.

15. The method of claim 14, wherein the step of coupling the evacuation port assembly includes positioning the servicing tube to extend at an acute angle from the structural wrapper.

16. A method of servicing an insulated door, comprising:
    providing a structural wrapper defining an insulating cavity in fluid communication with an evacuation port assembly;
    removing a handle from the structural wrapper to provide access to the evacuation port assembly;
    evacuating the insulating cavity of the structural wrapper via the evacuation port assembly to define a select pressure differential between the insulating cavity and an area external to the structural wrapper; and
    coupling the handle to the structural wrapper over the evacuation port assembly.

17. The method of claim 16, further comprising:
    cutting a servicing end of a servicing tube of the evacuation port assembly to provide fluid communication between an evacuation device engaged with the servicing tube and the insulating cavity.

18. The method of claim 16, further comprising:
    crimping a servicing end of a servicing tube of the evacuation port assembly to retain the select pressure differential.

19. The method of claim 16, wherein the step of coupling the handle to the structural wrapper includes positioning the handle to conceal the evacuation port assembly.

20. The method of claim 16, wherein the step of evacuating the insulating cavity includes drawing an at least partial vacuum within the structural wrapper.

* * * * *